United States Patent
Nelson

(10) Patent No.: US 10,507,541 B2
(45) Date of Patent: Dec. 17, 2019

(54) SOLDERING JIG ASSEMBLY

(71) Applicant: John Nelson, Inver Grove Heights, MN (US)

(72) Inventor: John Nelson, Inver Grove Heights, MN (US)

(*) Notice: Subject to any disclaimer, the term of this patent is extended or adjusted under 35 U.S.C. 154(b) by 440 days.

(21) Appl. No.: 15/432,237

(22) Filed: Feb. 14, 2017

(65) Prior Publication Data

US 2018/0229323 A1    Aug. 16, 2018

(51) Int. Cl.
| | | |
|---|---|---|
| *B23K 37/04* | (2006.01) | |
| *B23K 3/08* | (2006.01) | |
| *B23K 1/00* | (2006.01) | |
| *B23K 1/19* | (2006.01) | |
| *B23K 101/38* | (2006.01) | |
| *B23K 101/32* | (2006.01) | |

(52) U.S. Cl.
CPC ............ *B23K 3/087* (2013.01); *B23K 1/0016* (2013.01); *B23K 1/19* (2013.01); *B23K 37/0435* (2013.01); *B23K 37/0443* (2013.01); *B23K 2101/32* (2018.08); *B23K 2101/38* (2018.08)

(58) Field of Classification Search
CPC ........ B23K 3/087; B23K 1/19; B23K 1/0016; B23K 37/0443; B23K 2101/32; B23K 2101/38; B23K 37/04–37/0461
USPC ..... 228/179.1–180.22, 44.3, 49.4, 44.7, 49.5
See application file for complete search history.

(56) References Cited

U.S. PATENT DOCUMENTS

| | | | | |
|---|---|---|---|---|
| 1,488,932 | A | | 4/1924 | Menyhart |
| 1,751,509 | A | * | 3/1930 | Cunningham ......... B23K 3/087 219/85.19 |
| 2,308,098 | A | | 1/1943 | Neal |
| 3,024,752 | A | | 3/1962 | Marsh |
| 3,398,874 | A | | 8/1968 | Sauer |
| 3,568,295 | A | * | 3/1971 | Moran ................... H05K 3/306 228/103 |
| 3,614,832 | A | * | 10/1971 | Chance et al. ....... B23K 1/0056 29/831 |
| 3,634,649 | A | * | 1/1972 | Rager .................... H01R 4/625 219/137 R |
| 3,721,003 | A | * | 3/1973 | Ueda ...................... H01C 17/28 29/854 |
| 3,794,803 | A | * | 2/1974 | Valdeck .................... B21C 1/22 219/61 |
| 4,176,778 | A | | 12/1979 | Fortune |
| 5,307,977 | A | * | 5/1994 | Park ........................ B23K 37/04 228/4.5 |
| D372,498 | S | | 8/1996 | Sato |
| 5,937,485 | A | * | 8/1999 | Dittmer ..................... B42F 1/12 24/536 |
| 6,027,068 | A | | 2/2000 | Lantsman |
| 6,113,087 | A | * | 9/2000 | Taylor .................... B62D 65/02 269/289 R |

(Continued)

FOREIGN PATENT DOCUMENTS

CN    201573398 U  *  9/2010
CN    203198454 U  *  9/2013

(Continued)

*Primary Examiner* — Kiley S Stoner

(57) ABSTRACT

A soldering jig assembly for soldering conductors together includes a plate that may be positioned on a support surface. A pair of gripping units is provided. Each of the gripping units is coupled to the plate and each of the gripping units is selectively manipulated. Each of the gripping units engages an associated one of a pair of conductors.

5 Claims, 3 Drawing Sheets

(56) References Cited

U.S. PATENT DOCUMENTS

| | | | | |
|---|---|---|---|---|
| 6,139,064 | A * | 10/2000 | Maier-Hunke | B42F 9/007 281/15.1 |
| 6,327,749 | B1 * | 12/2001 | Antinone | B42F 1/006 24/67 R |
| 7,730,593 | B1 * | 6/2010 | Juilly | B42F 1/06 24/67 R |
| 8,091,757 | B1 * | 1/2012 | Stawarski | B23K 3/063 228/4.5 |
| 8,397,410 | B1 * | 3/2013 | Lau | B42F 1/006 116/236 |
| 9,044,992 | B1 * | 6/2015 | Miller | B44C 5/00 |
| 10,081,214 | B1 * | 9/2018 | Cuadrado | B42F 1/006 |
| 10,315,265 | B2 * | 6/2019 | Lu | B23K 3/02 |
| 2003/0115722 | A1 * | 6/2003 | Shogbamimu | B42F 1/006 24/67 R |
| 2005/0060923 | A1 * | 3/2005 | Ardern, II | G09F 7/02 40/658 |
| 2007/0175002 | A1 * | 8/2007 | Joe | B42F 1/006 24/67.5 |
| 2008/0067164 | A1 | 3/2008 | Kuo | |
| 2014/0201951 | A1 * | 7/2014 | Starken | B42F 1/006 24/67.5 |
| 2015/0000084 | A1 * | 1/2015 | Lim | B42F 1/006 24/67.5 |
| 2015/0115017 | A1 * | 4/2015 | Harbaugh | B23K 37/0408 228/44.3 |
| 2018/0055217 | A1 * | 3/2018 | Fryshman | A47B 23/043 |

FOREIGN PATENT DOCUMENTS

| | | | |
|---|---|---|---|
| CN | 203887438 U | * | 10/2014 |
| CN | 104846617 A | * | 8/2015 |
| EP | 2181794 | | 10/2009 |
| JP | 01296580 A | * | 11/1989 |
| JP | 2013018256 A | * | 1/2013 |
| JP | 2016121447 A | * | 7/2016 |

* cited by examiner

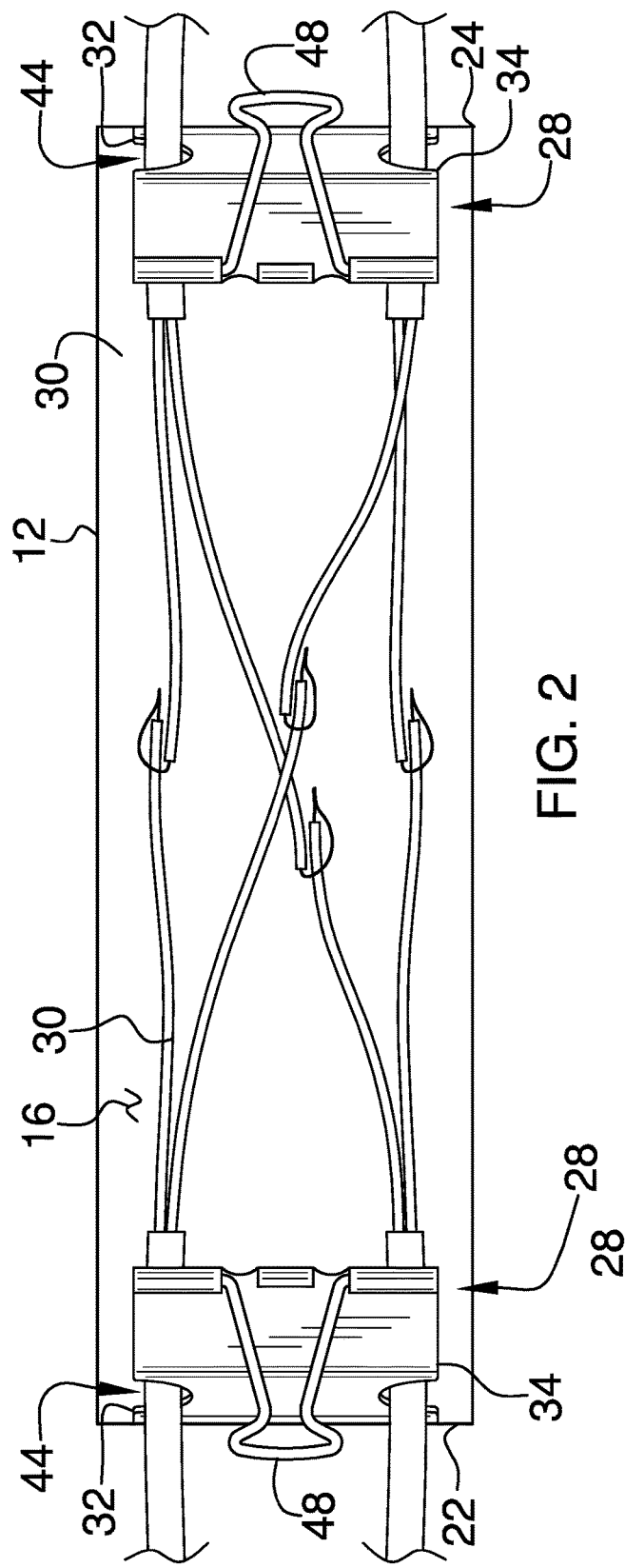
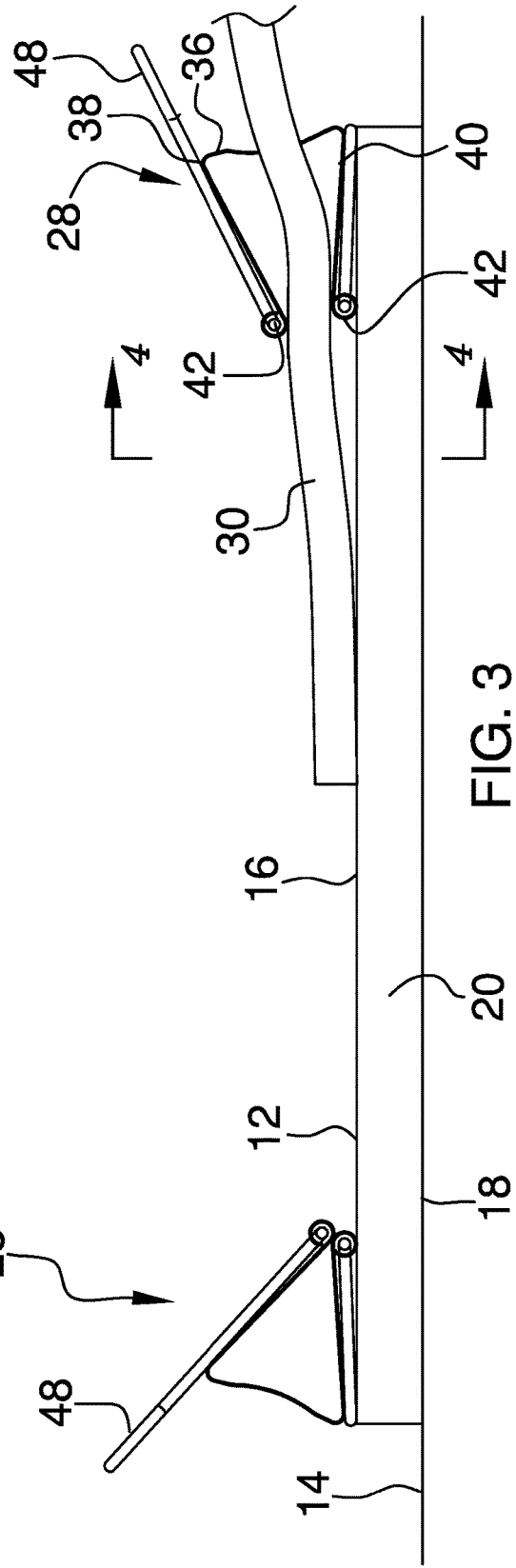

SOLDERING JIG ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to soldering devices and more particularly pertains to a new soldering device for soldering conductors together.

BRIEF SUMMARY OF THE INVENTION

An embodiment of the disclosure meets the needs presented above by generally comprising a plate that may be positioned on a support surface. A pair of gripping units is provided. Each of the gripping units is coupled to the plate and each of the gripping units is selectively manipulated. Each of the gripping units engages an associated one of a pair of conductors.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 2 is a top view of an embodiment of the disclosure.

FIG. 3 is a front view of an embodiment of the disclosure.

DETAILED DESCRIPTION OF THE INVENTION

Figure 1:
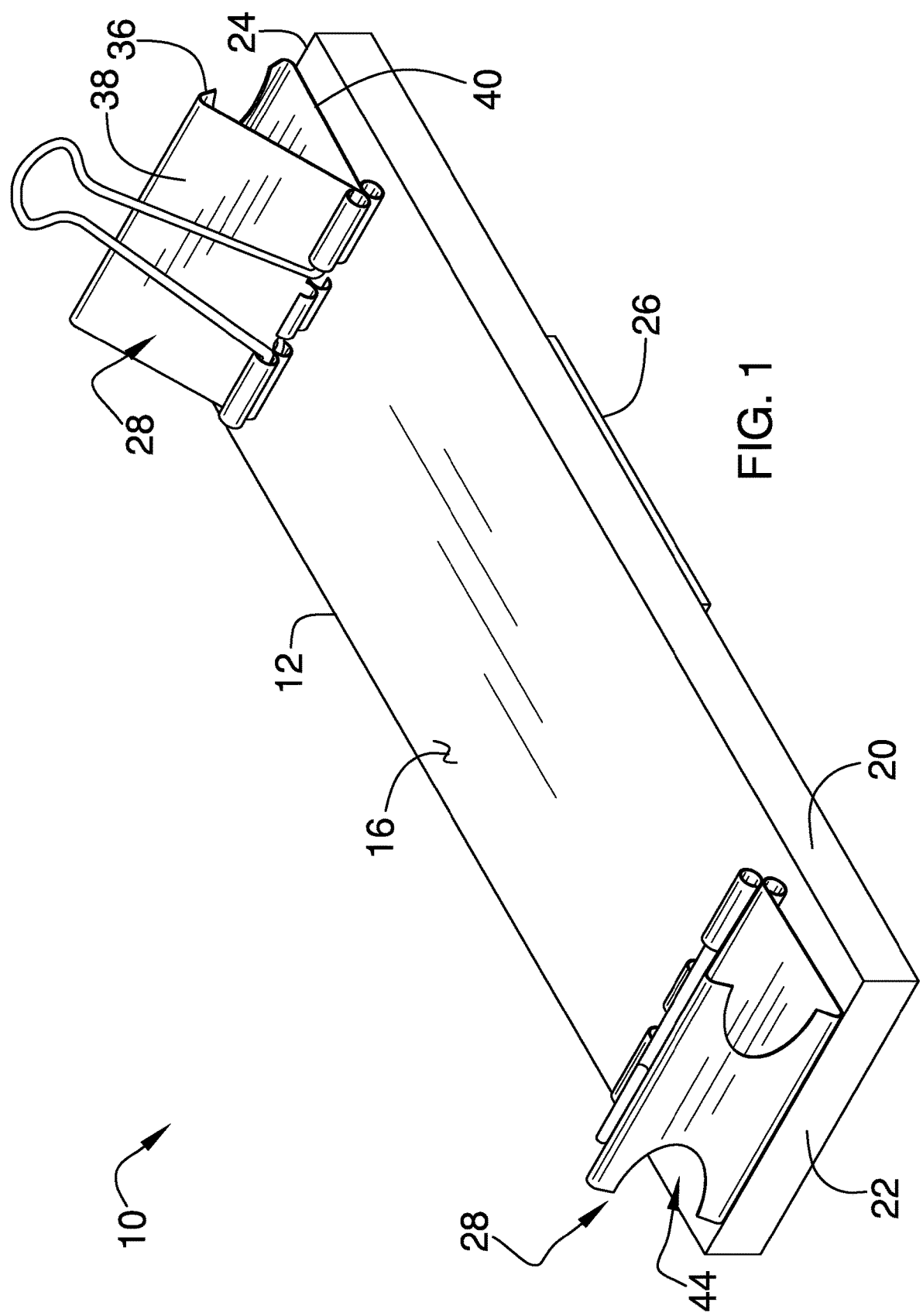
FIG. 1 is a top perspective view of a soldering jig assembly according to an embodiment of the disclosure.
Figure 4:
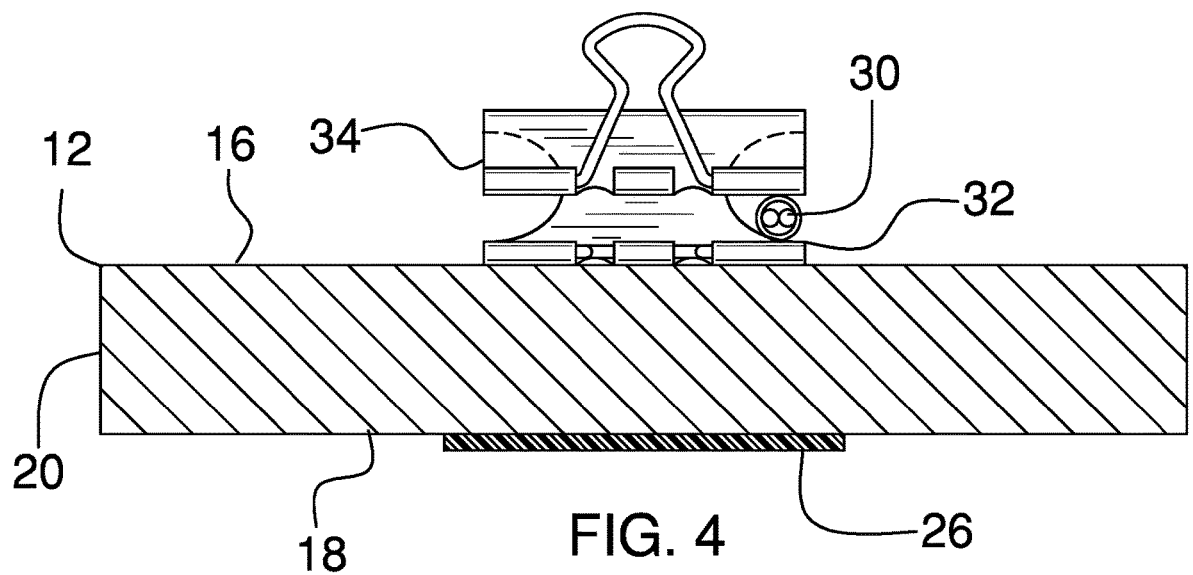
FIG. 4 is a cross sectional view taken along line 4-4 of FIG. 3 of an embodiment of the disclosure.
Figure 5:
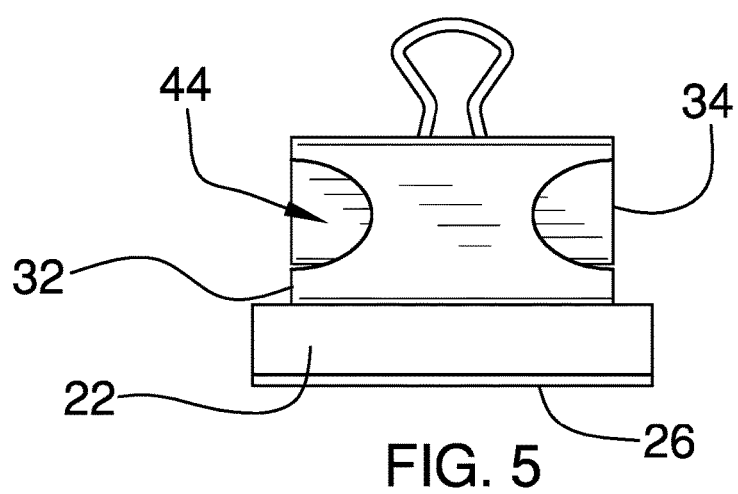
FIG. 5 is a right side view of an embodiment of the disclosure.

With reference now to the drawings, and in particular to FIGS. 1 through 5 thereof, a new soldering device embodying the principles and concepts of an embodiment of the disclosure and generally designated by the reference numeral 10 will be described.

As best illustrated in FIGS. 1 through 5, the soldering jig assembly 10 generally comprises a plate 12 that may be positioned on a support surface 14. The support surface 14 may be a table or the like. The plate 12 has a top surface 16, a bottom surface 18 and a peripheral edge 20 extending therebetween. The peripheral edge 20 has a first lateral side 22 and a second lateral side 24.

A coupler 26 is provided. The coupler 26 is coupled to the bottom surface 18 of the plate 12. The coupler 26 engages the support surface 14 thereby inhibiting the plate 12 from sliding on the support surface 14. Moreover, the coupler 26 may be a magnet.

A pair of gripping units 28 is provided. Each of the gripping units 28 is coupled to the plate 12 and each of the gripping units 28 may be manipulated. Each of the gripping units 28 selectively engages an associated one of a plurality of conductors 30. Each of the plurality of conductors 30 may include a pair of insulated wires or the like.

Each of the gripping units 28 is positioned on the top surface 16 of the plate 12. Each of the gripping units 28 is aligned with an associated one of the first lateral side 22 and the second lateral side 24 of the plate 12. Moreover, each of the gripping units 28 may be a binder clip or the like.

Each of the gripping units 28 comprises a vertical panel 36 that extends between a top panel 38 and a bottom panel 40. Each of the top panel 38 and the bottom panel 40 has a distal edge 42 with respect to the vertical panel 36. The distal edge 42 corresponding to each of the top panel 38 and the bottom panel 40 are biased to engage each other. The bottom panel 40 is coupled to the top surface 16 of the plate 12.

The vertical panel 36 has a first lateral edge 32 and a second lateral edge 34. The first lateral edge 32 of the vertical panel 36 has a first notch 44 extending toward the second lateral edge 34. An associated conductor 30 is selectively extended through the first notch 44. Moreover, the conductor 30 extended through the first notch 44 is compressed between the distal edge 42 corresponding to each of the top panel 38 and the bottom panel 40. Each of a pair of wires corresponding to the conductor 30 is extended through the first notch 44 and is positioned on the top surface 16 of the plate 12.

The second lateral edge 34 has a second notch 47 extending toward the first lateral edge 32 and an associated conductor 30 is extended through the second notch 47. The conductor 30 extended through the second notch 47 is compressed between the distal edge 42 corresponding to each of the top panel 38 and the bottom panel 40. Each of a pair of wires corresponding to the conductor 30 is extended through the second notch 47 and is positioned on the top surface 16 of the plate 12. Thus, the pair of wires corresponding to selected ones of the conductors 30 may be soldered together. Additionally, each of the first 44 and second 47 notches are concavely arcuate to inhibit each of the first 44 and second 47 notches from frictionally engaging the associated conductor 30.

A handle 48 is provided. The handle 48 is coupled to the top panel 38 and the handle 48 may be manipulated. The handle 48 extends beyond the vertical panel 36. The handle 48 urges the associated gripping unit 28 into an open position. Moreover, the handle 48 urges the distal edge 42 corresponding to the top panel 38 away from the distal edge 42 corresponding to the bottom panel 40. Thus, each of the top panel 38 and the bottom panel 40 facilitate the associated conductor 30 to be passed therebetween.

In use, the handle 48 corresponding to each of the gripping units 28 is manipulated to position the associated gripping units 28 in the open position. Each of the conductors 30 is extended through selected ones of the first 44 and second 47 the notches in the associated gripping unit. Moreover, the pair of wires corresponding selected ones of the conductors 30 is aligned with each other. The handle 48 corresponding to the associated gripping unit 28 is released. Thus, the associated gripping unit 28 retains the associated conductors 30 on the plate 12.

The pair of wires corresponding to the selected conductors 30 is soldered together. The handle 48 corresponding to each of the gripping units 28 is manipulated to position the associated gripping units 28 in the open position. Thus, the plurality of soldered conductors 30 is removed from the pair of gripping units 28. The process of soldering a plurality of conductors 30 together is repeated any selected number of times. Moreover, a plurality of conductors 30 having only a single wire may each be selectively soldered together.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A soldering jig assembly being configured to engage a pair of conductors thereby facilitating the conductors to be soldered, said assembly comprising:
   a plate being configured to be positioned on a support surface, said plate having a top surface, a bottom surface and a peripheral edge extending therebetween, said peripheral edge having a first lateral side and a second lateral side; and
   a pair of gripping units, each of said gripping units being coupled to said plate wherein each of said gripping units is configured to be manipulated, each of said gripping units being configured to engage an associated one of a plurality of conductors, each of said gripping units comprising a vertical panel extending between a top panel and a bottom panel, each of said top panel and said bottom panel having a distal edge with respect to said vertical panel, said vertical panel having a first lateral edge and a second lateral edge, said distal edge corresponding to each of said top panel and said bottom panel being biased to engage each other, said bottom panel being coupled to said top surface of said plate, said vertical panel corresponding to each of said gripping units having a first lateral edge and a second lateral edge, said first lateral edge of said vertical panel having a first notch extending toward said second lateral edge wherein said first notch is configured to have an associated conductor extended therethrough thereby facilitating the associated conductor to be compressed between said distal edge corresponding to each of said top panel and said bottom panel.

2. The assembly according to claim 1, further comprising a coupler being coupled to said bottom surface of said plate wherein said coupler is configured to engage the support surface thereby inhibiting said plate from sliding on the support surface.

3. The assembly according to claim 1, wherein said second lateral edge of said vertical panel having a second notch extending toward said first lateral edge wherein said second notch is configured to have an associated conductor extended therethrough thereby facilitating the associated conductor to be compressed between said distal edge corresponding to each of said top panel and said bottom panel, said top surface of said panel being configured to have a free end corresponding to the associated conductor being positioned thereon thereby facilitating the free end of the associated conductor to be soldered.

4. The assembly according to claim 1, further comprising a handle being coupled to said top panel wherein said handle is configured to be manipulated, said handle urging said distal edge corresponding to said top panel away from said distal edge corresponding to said bottom panel wherein each of said top panel and said bottom panel are configured to facilitate the associated conductor to be passed therebetween.

5. A soldering jig assembly being configured to engage a pair of conductors thereby facilitating the conductors to be soldered, said assembly comprising:
   a plate being configured to be positioned on a support surface, said plate having a top surface, a bottom surface and a peripheral edge extending therebetween, said peripheral edge having a first lateral side and a second lateral side;
   a coupler being coupled to said bottom surface of said plate wherein said coupler is configured to engage the support surface thereby inhibiting said plate from sliding on the support surface; and
   a pair of gripping units, each of said gripping units being coupled to said plate wherein each of said gripping units is configured to be manipulated, each of said gripping units being configured to engage an associated one of a plurality of conductors, each of said gripping units being positioned on said top surface of said plate, each of said gripping units having a first lateral edge and a second lateral edge, each of said gripping units comprising:

a vertical panel extending between a top panel and a bottom panel, each of said top panel and said bottom panel having a distal edge with respect to said vertical panel, said vertical panel having a first lateral edge and a second lateral edge, said distal edge corresponding to each of said top panel and said bottom panel being biased to engage each other, said bottom panel being coupled to said top surface of said plate, said distal edge corresponding to each of said top panel and said bottom panel being biased to engage each other, said bottom panel being coupled to said top surface of said plate, said vertical panel corresponding to each of said gripping units having a first lateral edge and a second lateral edge, said first lateral edge of said vertical panel having a first notch extending toward said second lateral edge wherein said first notch is configured to have an associated conductor extended therethrough thereby facilitating the associated conductor to be compressed between said distal edge corresponding to each of said top panel and said bottom panel, said second lateral edge of said vertical panel having a second notch extending toward said first lateral edge wherein said second notch is configured to have an associated conductor extended therethrough thereby facilitating the associated conductor to be compressed between said distal edge corresponding to each of said top panel and said bottom panel, said top surface of said panel being configured to have a free end corresponding to the associated conductor being positioned thereon thereby facilitating the free end of the associated conductor to be soldered, and a handle being coupled to said top panel wherein said handle is configured to be manipulated, said handle urging said distal edge corresponding to said top panel away from said distal edge corresponding to said bottom panel wherein each of said top panel and said bottom panel are configured to facilitate the associated conductor to be passed therebetween.

* * * * *